US010969819B2

(12) United States Patent
Laschinsky et al.

(10) Patent No.: US 10,969,819 B2
(45) Date of Patent: Apr. 6, 2021

(54) SECURITY CONTROL AND METHOD FOR OPERATING A SECURITY CONTROL

(71) Applicant: WAGO Verwaltungsgesellschaft mbH, Minden (DE)

(72) Inventors: Maxim Laschinsky, Minden (DE); Christian Voss, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 130 days.

(21) Appl. No.: 16/086,349

(22) PCT Filed: Feb. 14, 2017

(86) PCT No.: PCT/EP2017/053212
§ 371 (c)(1),
(2) Date: Sep. 19, 2018

(87) PCT Pub. No.: WO2017/162371
PCT Pub. Date: Sep. 28, 2017

(65) Prior Publication Data
US 2019/0094903 A1 Mar. 28, 2019

(30) Foreign Application Priority Data

Mar. 24, 2016 (DE) .................. 10 2016 204 965.8

(51) Int. Cl.
*G06F 1/06* (2006.01)
*G05B 9/03* (2006.01)
(Continued)

(52) U.S. Cl.
CPC ............... *G06F 1/06* (2013.01); *G05B 9/03* (2013.01); *G05B 19/042* (2013.01); *G06F 1/12* (2013.01);
(Continued)

(58) Field of Classification Search
CPC .... G06F 1/12; G06F 11/0757; G06F 11/0772; G06F 11/076; G06F 1/06; G05B 9/03; G05B 19/042; G05B 2219/25047
(Continued)

(56) References Cited

U.S. PATENT DOCUMENTS 5,991,844 A * 11/1999 Khosrowpour ..... G06F 11/2005
370/285
6,202,115 B1 * 3/2001 Khosrowpour ..... G06F 12/0802
710/312
(Continued)

FOREIGN PATENT DOCUMENTS

DE 3225455 A1 1/1984
DE 101 63 010 A1 11/2002
(Continued)

OTHER PUBLICATIONS

International Search Report and Written Opinion dated Apr. 18, 2017 in International Application No. PCT/EP2017/053212.

*Primary Examiner* — Ji H Bae
(74) *Attorney, Agent, or Firm* — Muncy, Geissler, Olds & Lowe, P.C.

(57) ABSTRACT

The present invention relates to a security control comprising a first controller having a first clock generator for generating a first clock signal, a separate second controller having a second clock generator for generating a second clock signal, wherein the first clock signal is output to a first input of the first controller and to a first input of the second controller, and the second clock signal is output to a second input of the first controller and to a second input of the second controller. In addition, the present invention relates to a method for operating a security control.

12 Claims, 6 Drawing Sheets

(51) Int. Cl.
*G05B 19/042* (2006.01)
*G06F 1/12* (2006.01)
*G06F 11/07* (2006.01)

(52) U.S. Cl.
CPC .. *G05B 2219/25047* (2013.01); *G06F 11/076* (2013.01); *G06F 11/0757* (2013.01); *G06F 11/0772* (2013.01)

(58) Field of Classification Search
USPC .................... 713/400, 500, 502; 714/55, 814
See application file for complete search history.

(56) References Cited

U.S. PATENT DOCUMENTS

2004/0243878 A1* 12/2004 Kondo ...................... G06F 1/06
713/600
2015/0270944 A1* 9/2015 Tanno .................. H04J 3/0688
370/509

FOREIGN PATENT DOCUMENTS

DE 10 2007 018468 A1 10/2008
EP 1 916 581 A2 4/2008

* cited by examiner

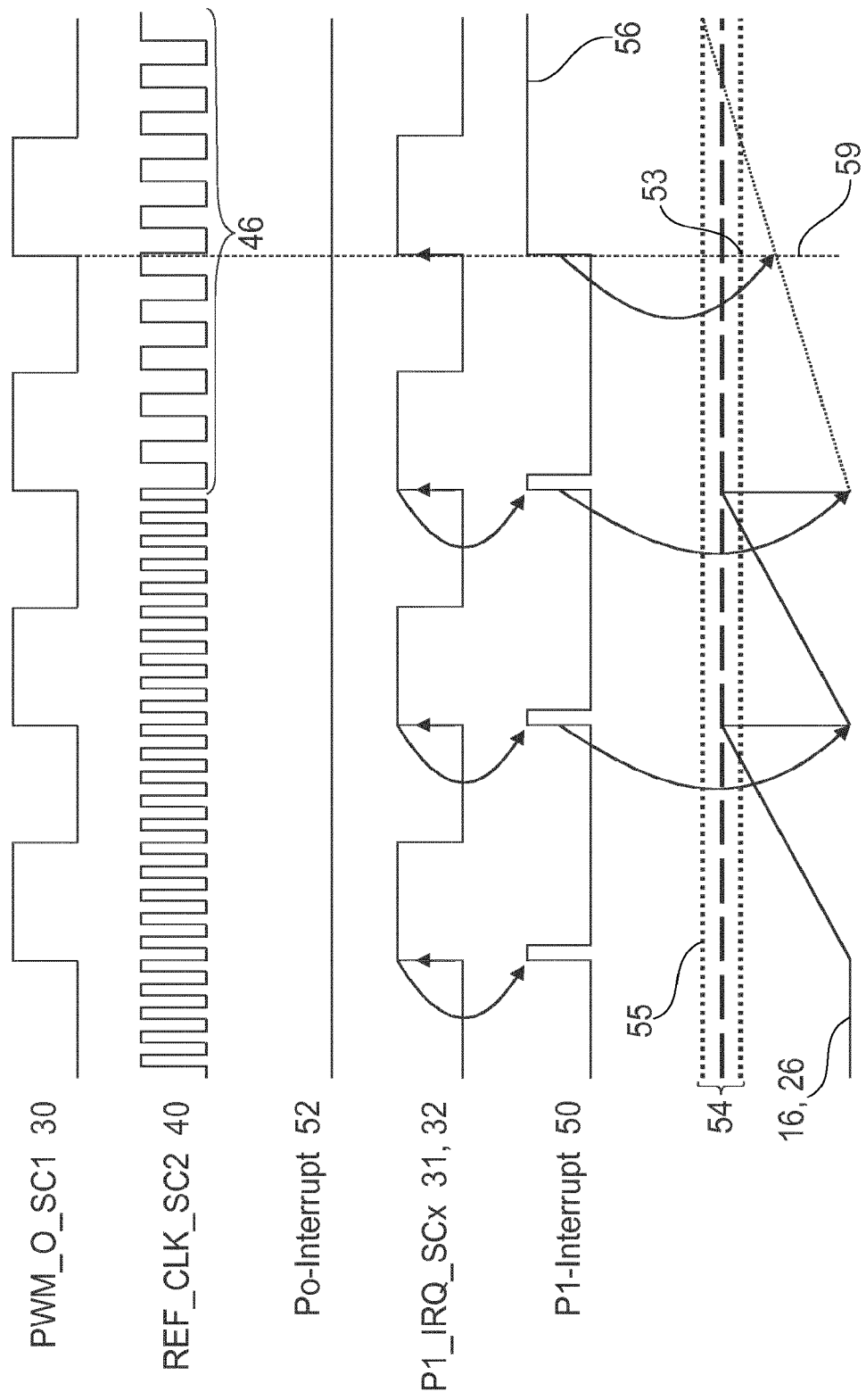

SECURITY CONTROL AND METHOD FOR OPERATING A SECURITY CONTROL

This application is a 371 National Phase of PCT Application No. PCT/EP2017/053212, filed on Feb. 14, 2017; and this application claims priority of Application No. DE 10 2016 204 965.8 filed in Germany on Mar. 24, 2016, and which is herein incorporated by reference in its entirety.

TECHNICAL FIELD

The present invention relates to a security control and a method for operating a security control.

TECHNICAL BACKGROUND

In automation technology, security controls are used to monitor security-critical systems and processes and to ensure safe operation. The timely detection of deviations from normal operation is thereby of great importance in order to carry out appropriate countermeasures within a reasonable period of time.

In a welding robot, for example, the edges of the working area of the robot are monitored with light barriers. If, for example, a person passes one of these light barriers, the security control must ensure that the system is placed in a secure state before the human being is harmed. This serves to protect people in the immediate vicinity of a system but also to protect the system itself.

To protect against a failure of the security control, and thus an uncontrolled operation of the system, security controls are operated redundantly, i.e. on at least two processors or controllers, the same software for controlling a system or a process is preferably executed isochronous.

So-called lock-step controllers, such as for example the TMS570 of Texas Instruments comprises two processor cores, wherein on each processor core the same program is running. Because the controller uses only one crystal as the clock source for both processor cores, the two programs are executed isochronous. However, in the event of a clock source error, security-related outputs cannot be turned off by the processor cores.

Document EP 1 916 581 A2 describes a mutual monitoring of two controllers, whereby clock errors can be detected. First, a first controller monitors the accuracy of a reference time base of a second controller, and then the roles of the two controllers are swapped according to a predetermined pattern and the second controller monitors the accuracy of the first controller. This is to ensure that all security functions that are executed on the two controllers run in a given time. If an error should be detected, e.g. if the security functions are timed out, the controllers take up the secure state.

In this method, however, the time when an error is detected, can only be given inaccurate. The exact indication of reaction times of a control is, however, not possible with it. However, such response times are of vital importance in the area of security functions and should be determinable as accurate as possible. In addition, during execution of the security loops waiting times occur relatively often. These should be avoided so as not to unnecessarily prolong an execution of a program and to ensure a timely response to occurring errors.

It is the problem of the present invention to provide a security control and a method for operating a security control which meet the above-mentioned requirements.

SUMMARY OF THE INVENTION

The problem is solved by a security control according to claim 1. In particular, the problem is solved by a security control comprising a first controller with a first clock generator for generating a first clock signal; a separate second controller having a second clock generator for generating a second clock signal; wherein the first clock signal is output to a first input of the first controller and to a first input of the second controller; and the second clock signal is output to a second input of the first controller and to a second input of the second controller.

By providing a common clock signal to both controllers, a synchronous execution of the two programs on the first and second controllers is possible. The controllers themselves can be, for example, Microcontrollers, CPUs or programmable logics. The first clock signal is provided with the second clock signal a reference clock signal. By comparing the two clock signals with each other clock errors can be detected. This applies both to clock errors of the first clock signal and to clock errors of the second clock signal. Preferably, each clock generator is a quartz. By separate first and second inputs at the first and the second controller, the two clock signals are also provided independently of each other and without timely influence to the respective controller.

Preferably, the frequency of the second clock signal is higher than the frequency of the first clock signal. Thereby, an integer number of clocks of the second clock signal occurring during a clock interval of the first clock signal can be detected. The greater the frequency difference, the more accurate frequency deviations of the first clock signal and/or the second clock signal with respect to their respective setpoints can be detected.

Preferably, the first controller comprises a first counter and the second controller comprises a second counter, and the second clock signal is routed to the first counter and the second counter, and the clocks of the second clock signal are counted by the first and second counters. By counting clocks of the second clock signal, the clock length of the first clock signal can be easily determined. Preferably, the counters are configured as hardware counters. The counting itself can either be an upward counting or a downward counting.

Preferably, the first clock signal triggers a P1-interrupt simultaneously in the first and second controllers; the first counter and the second counter determine the number of clocks of the second clock signal since a previous P1-interrupt; the first controller and/or the second controller is adapted to correlate the counter readings of the respective first or second counter with the time between two P1-interrupts; and the first controller and/or the second controller provides an error output if the controller determines that the counter reading of the respective first or second counter is outside its reference range.

Thus, an error is detected and output when the clock frequency of the first or second clock generator compared to their respective nominal frequency changed so much that a tolerance range is exceeded or fallen below what is detected by means of the controller by comparing the counter reading of the first or second counter with its reference range. Thus, a simple and reliable detection of frequency deviations of the first or second clock generator is possible, such that an error in the synchronicity of the two controllers of the security control is reliably detected. By specifying the frequency of the first and second clock signal and the reference range, an exact indication of reaction times is possible.

In doing so, during a P1-interrupt, preferably processes of priority 1, i.e. processes with high priority, are started. And preferably, a P1-interrupt is triggered with an edge of a P1-interrupt request. In addition, the counter reading of the first counter and the counter reading of the second counter are evaluated during a P1-interrupt. Preferably, the counter readings of the first and the second counter are correlated by means of a window comparator with the time between two P1-interrupts. Thereby, the P1-interrupts are preferably two consecutive P1-interrupts. The reference range is preferably an expected number of clocks with a certain tolerance range, based on the frequency of the first clock signal and the frequency of the second clock signal, which defines a maximum value and a minimum value of the reference range. Preferably, the maximum and the minimum value of the reference range can be arbitrarily set, such that an individual adaptation of the permissible deviation in the frequencies is possible.

Preferably, the error output of the first or second controller causes a security-related shutdown if at least one of the counter readings of the first or second counter is below the minimum value of the reference range. As a result, the running processes, which are otherwise executed, and are interrupted only briefly by a P1-interrupt, are no longer executed. This allows a very fast transfer of the security control into a mode of security-related shutdown. Since the clock interval of the first clock signal is known, the time until when the error is detected in this situation is also accurately determinable.

Preferably, the first and/or the second controller further initiates a security-related shutdown if at least one of the counter readings of the first or second counter exceeds the maximum value of the reference range. For this purpose, the corresponding first and/or second counter preferably generates a counter interrupt and a P0-interrupt request, respectively, which triggers a P0-interrupt. Because the frequency of the second clock signal and the maximum value of the reference range are known, also an exact time specification, when in this case the P0-interrupt is executed, is possible. In addition, by directly triggering a P0-interrupt, using the corresponding first and/or second counters, it is possible to react very quickly to a detected error. If the reference signal, i.e. the second clock signal, is faster than the first clock signal, this has the same effect as if the first clock signal were slower than the second clock signal. In both cases, the security control is security-related shut down within a defined time.

Preferably, the error output is already provided during a P1-interrupt. The timing of the first and the second clock signal to each other is checked for deviation within a short time. This leads to very short reaction times and guarantees a continuous monitoring of the security control on clock or frequency errors.

The above-mentioned problems are also solved by a method for operating a security control comprising a first controller with a first clock generator and a separate second controller with a second clock generator, wherein the method comprises the following steps: generating a first clock signal by the first clock generator; generating a second clock signal independent of the first clock signal by the second clock generator; outputting the first clock signal at a first input of the first controller and at a first input of the second controller; and outputting the second clock signal at a second input of the first controller and at a second input of the second controller.

The fact that a common clock signal is provided on both controllers, a synchronous execution of the programs on the two controllers is possible. In addition, since the two clock signals are generated independently, they can be used for mutual comparison on possible clock or frequency errors. Preferably, the first clock signal is used to synchronously execute two identical or partially identical programs on the first and second controllers. Preferably, the second clock signal is used as a reference clock signal for the first clock signal. Since the first and second clock signals are each provided at a separate input at the first and second controllers, both clock signals can be used simultaneously and independently on each controller and monitored by each controller.

Preferably, the frequency of the second clock signal is higher than the frequency of the first clock signal. Thereby, an integer number of clocks of the second clock signal occurring during a clock interval of the first clock signal can be detected. The larger the frequency difference, the more accurately frequency deviations of the first clock signal and the second clock signal can be detected with respect to their respective setpoint.

Preferably, the method further comprises a check of the counter reading of the second clock signal by means of the first counter in the first controller and by the second counter in the second controller. By counting clocks of the second clock signal and checking the counter reading, the clock frequency of the first clock signal can be determined very easily. The counters are preferably hardware counters. Preferably, the counters can count up their counter reading or count down from an initial value.

Preferably, the method further comprises the following steps: triggering a P1-interrupt in the first and the second controller by the first clock signal; determining the number of clocks of the second clock signal since a previous P1-interrupt by means of the first counter and the second counter; correlating the counter reading of the first counter in the first controller and/or the second counter in the second controller with the time between two P1-interrupts; and providing an error output by means of the first controller and/or by means of the second controller if the counter reading of the respective first or second counter is outside its reference range.

By these processing steps, an error is detected and output if the clock frequency of the first or second clock generator changes significantly relative to their respective nominal frequency. Due to this deviation from the setpoint a tolerance range is exceeded or fallen below. The tolerance range ensures that small deviations from the setpoint are tolerable. Leaving the tolerance range is then detected by the controllers by comparing the counter reading of the first or second counter with its reference range. With this simple method a reliable detection of frequency deviations of the first or second clock generator is possible. An error in the synchronicity of the two controllers of the security control is thus reliably detected. By specifying the frequency of the first and second clock signal and the reference range then an exact indication of response times of the security control is possible.

In this case, preferably during a P1-interrupt processes of priority 1, i.e. processes with high priority, are started. And preferably, a P1-interrupt is triggered with an edge of a P1-interrupt request. In addition, preferably the counter reading of the first counter and the counter reading of the second counter are evaluated during a P1-interrupt. Preferably, the counter readings of the first and the second counter are correlated by means of a window comparator with the time between two P1-interrupts. The P1-interrupts are preferably two consecutive P1-interrupts. The reference range is preferably an expected number of clocks with a certain tolerance range, based on the frequency of the first clock signal and the frequency of the second clock signal, which defines a maximum value and a minimum value of the reference range. Preferably, the maximum and the minimum value of the reference range can be arbitrarily set, such that an individual adaptation of the permissible frequency deviation is possible.

Preferably, the method further comprises the steps of a security-related shutdown, which is effected by the error output of the first or second controller, if at least one of the counter readings of the first or second counter is below the minimum value of the reference range. As a result, the running processes, which are otherwise executed, and are interrupted only briefly by a P1-interrupt, are no longer executed. This allows a very fast transfer of the security control into a mode of security-related shutdown. Since the clock interval of the first clock signal is known, the period of time until when the error is detected in this situation, is also exactly determinable.

Preferably, the method further comprises the steps of a security-related shutdown, which is initiated by the first and/or the second counter, if at least one of the counter readings of the first or second counter exceeds the maximum value of the reference range. For this purpose, preferably the corresponding first and/or second counter generates a counter interrupt and a P0-interrupt request, respectively, which triggers a P0-interrupt. Because the frequency of the second clock signal and the maximum value of the reference range are known, an exact time prediction when in this case the P0-interrupt is executed at the latest, is possible. In addition, by the direct triggering of a P0-interrupt by means of the corresponding first and/or second counter a very fast reaction to the detected error is possible.

Preferably, the error output is provided during a P1-interrupt. The timing of the first and the second clock signal to each other is checked for deviation within a short time. This leads to very short reaction times and guarantees a continuous monitoring of the security control for clock errors.

BRIEF DESCRIPTION OF THE DRAWINGS

In the following preferred embodiments of the invention will be described with reference to the attached figures, in which shows:

FIG. 6 a schematic view of the signal curves in a faulty extended clock interval of the second clock signal.

DESCRIPTION OF EMBODIMENTS

In the following, preferred embodiments of the invention will be described in detail with reference to the figures.

Figure 1:
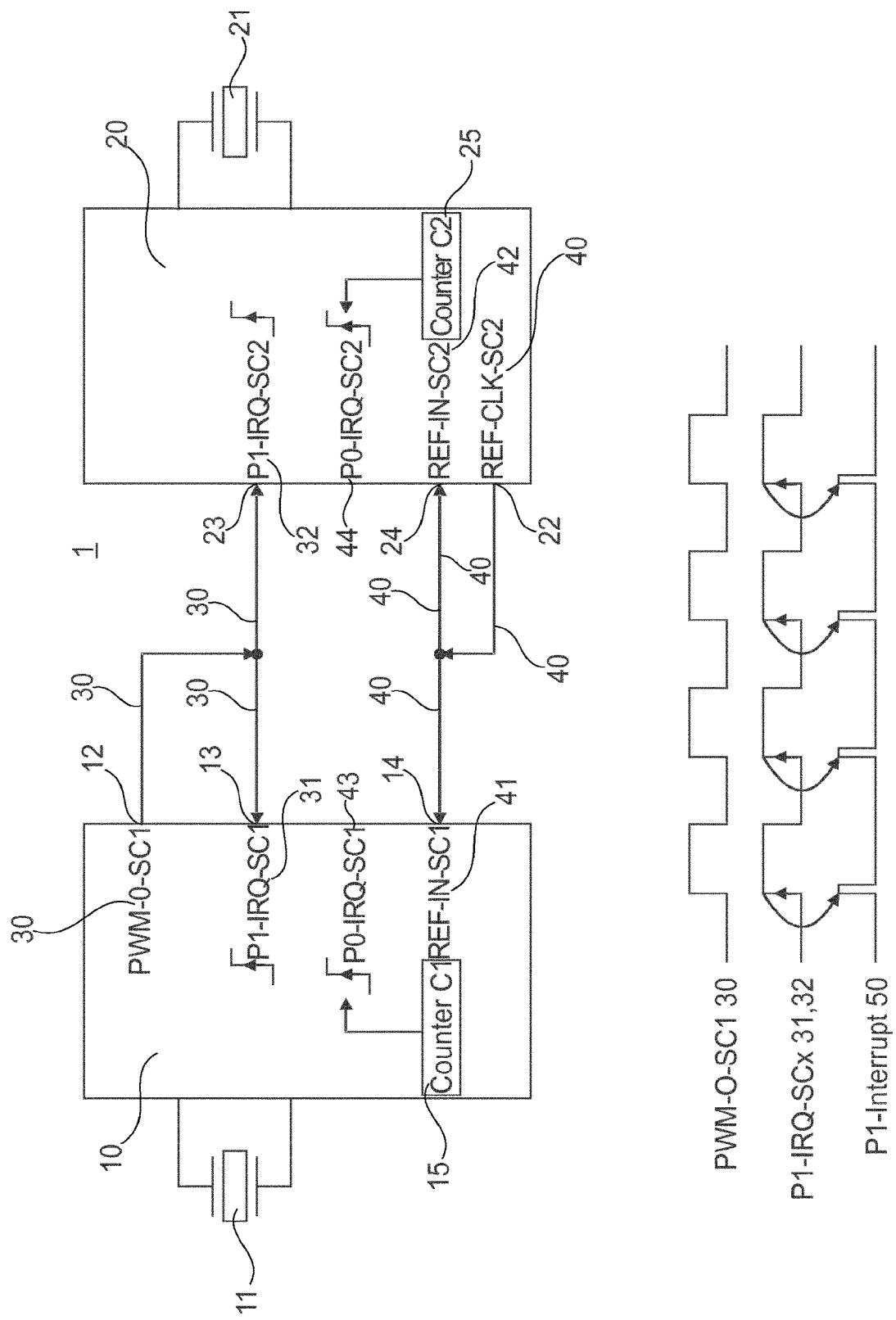
FIG. 1 a schematic view of a preferred embodiment of a security control with illustrated signal curves.

FIG. 1 shows a schematic view of a security control 1, which comprises a first controller 10 and a second controller 20. The first controller 10 comprises a first clock generator 11 and the second controller 20 comprises a second clock generator 21. The first clock generator 11 generates a first clock signal (PWM_O_SC1) 30 in the first controller 10. The second clock generator 21 generates a second clock signal (REF_CLK_SC2) 40 in the second controller 20.

The first clock signal 30 is simultaneously routed to a first interrupt-capable input 13 of the first controller 10 and to a first interrupt-capable input 23 of the second controller 20. In the first controller 10, the first clock signal 30 generates a P1-interrupt request (P1_IRQ_SC1) 31, which triggers a P1-interrupt 50. In the second controller 20, the first clock signal 30 generates a P1-interrupt request (P1_IRQ_SC2) 32, which triggers a P1-interrupt 50. The P1-interrupt 50 is generated to an edge of a P1-interrupt request 31, 32.

The second clock signal 40 is simultaneously routed to a second input 14 of the first controller 10 and to a second input 24 of the second controller 20. In the first controller 10, the second clock signal 40 is forwarded as an input signal (REF_IN_SC1) 41 to a first counter 15. In the second controller 20, the second clock signal 40 is forwarded as an input signal (REF_IN_SC2) 42 to a second counter 25.

In the first and second counters 15, 25 the number of clocks of the respective input signals 41, 42 is counted. It can be counted up or down. The first counter 15 is capable of generating a P0-interrupt request (Po_IRQ_SC1) 43. The second counter 25 is capable of generating a P0-interrupt request (Po_IRQ_SC2) 44. Both P0-interrupt requests 43, 44 then trigger a P0-interrupt 52 in the respective controller 10, 20. The P0-interrupt is executed in this embodiment as a permanent P0-interrupt 58 in case an error occurs.

Figure 2:
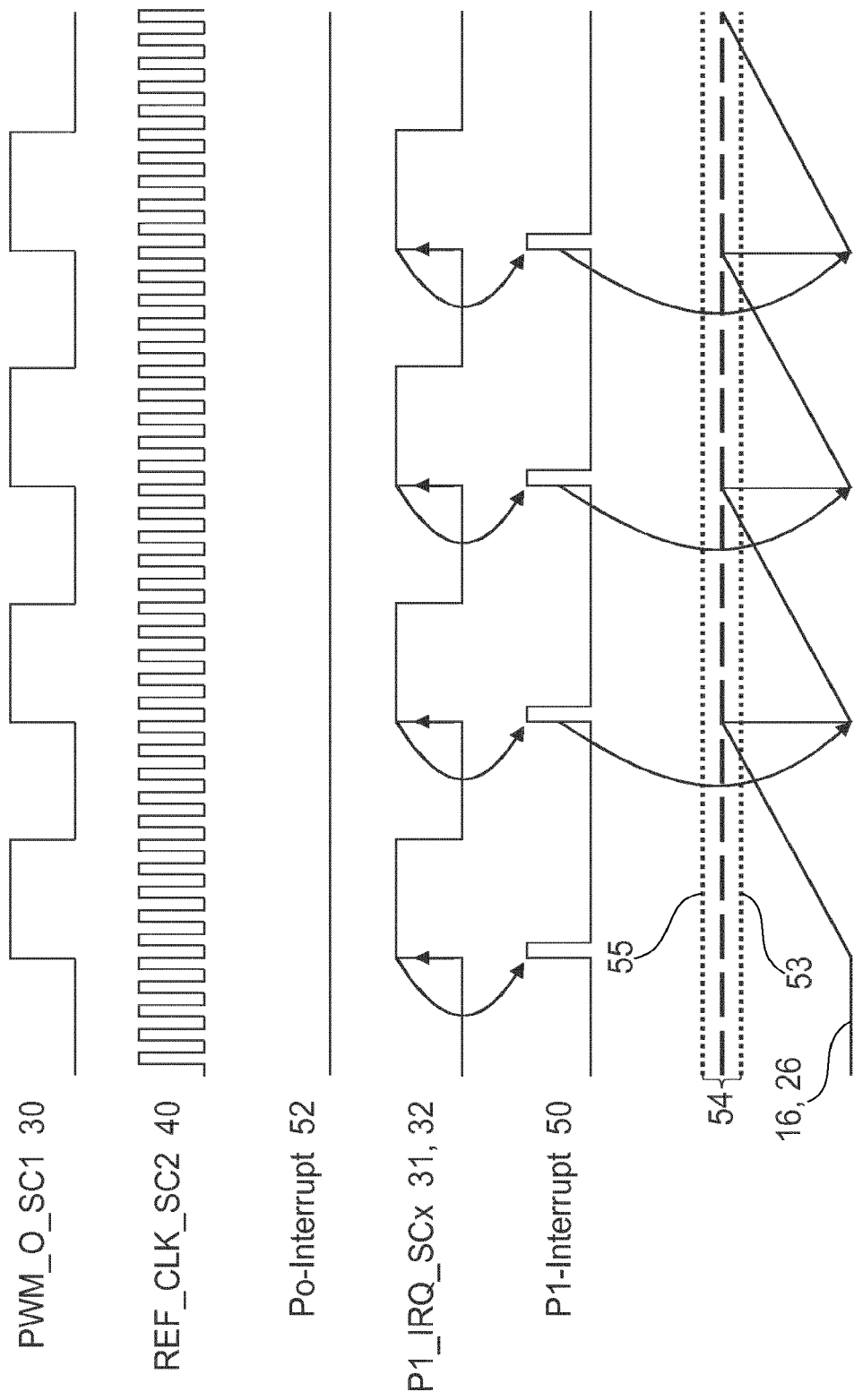
FIG. 2 a schematic view of the signal curves in normal operation of the security control according to FIG. 1.

FIG. 2 shows a schematic signal curve in normal operation, i.e. when the first and the second clock signal 30, 40 each follow their predetermined clock intervals and frequencies, respectively. The second clock signal 40 has a higher frequency than the first clock signal 30.

The first clock signal 30 generates the P1-interrupt requests 31, 32, which in turn generate a P1-interrupt 50 in their respective controllers 10, 20 in order to synchronize the start of the program sequences in the controllers 10, 20.

The number of clocks of the second clock signal 40 is counted in the first and the second counters 15, 25 of the respective controller 10, 20. In this embodiment it is counted up, such that the counter readings 16, 26 of the two corresponding counters 15, 25 increase.

If a P1-interrupt 50 is triggered, the counter readings 16, 26 are preferably reset to their original value. A further preferred embodiment is the formation of the difference to the last detected count at a running counter. When the security control 1 is in normal operation, i.e. the first and the second frequency 30, 40 hold their predetermined values, then the maximum counter values 16, 26 lie within their reference range 54, which defines the permissible tolerance of the frequency deviations, immediately before the evaluation, as it is shown in FIG. 2.

Figure 3:
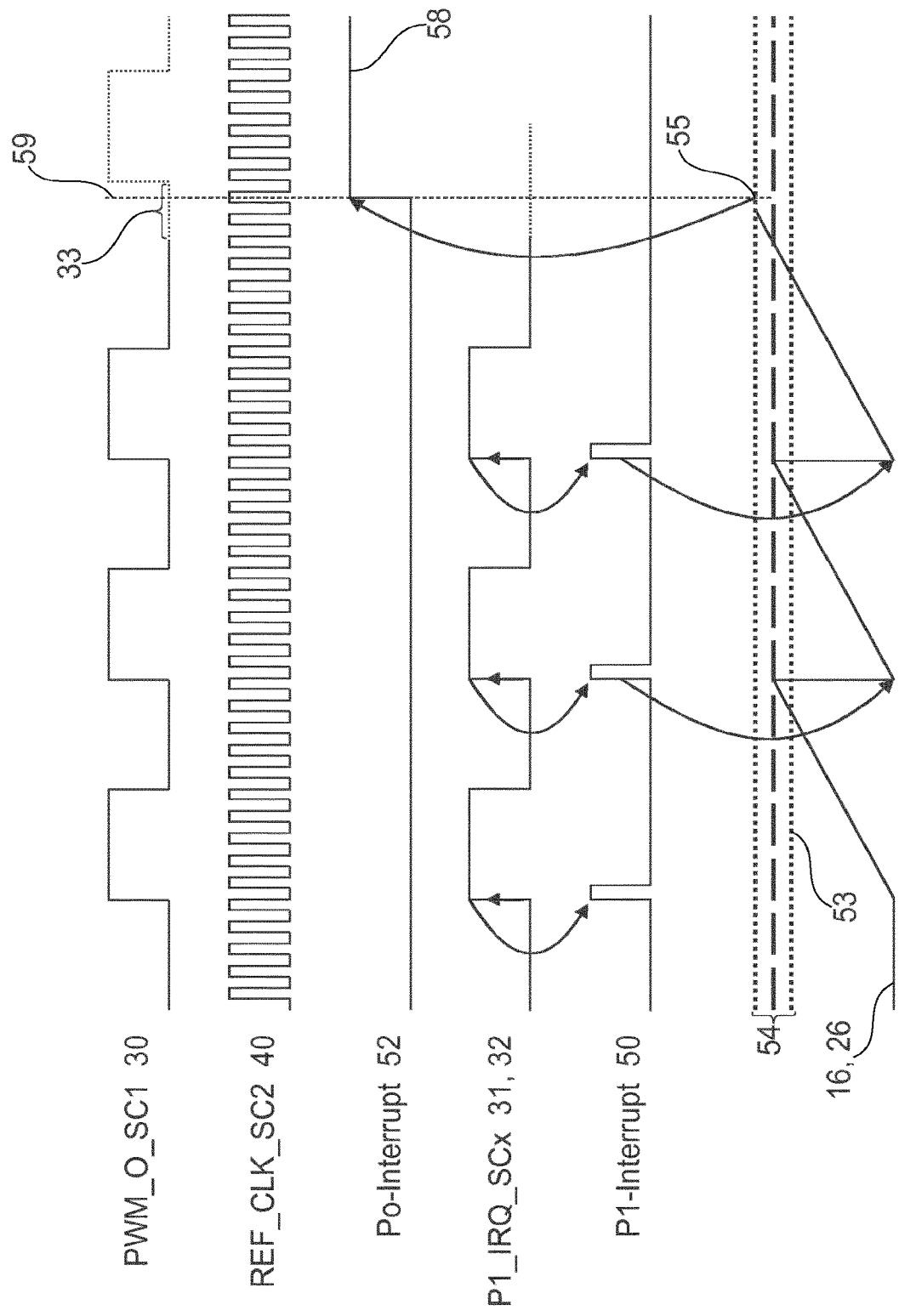
FIG. 3 a schematic view of the signal curves at a faulty extended clock interval of the first clock signal.

FIG. 3 shows the schematic signal curves in the case of a faulty extended clock interval 33 of the first clock signal 30. By delaying the clock of the first clock signal 30 no P1-interrupt requests 31, 32 are triggered, and thus no P1-interrupt 50. As a result, the counter readings 16, 26 of the two counters 15, 25 continue to increase until they reach and exceed, respectively, the maximum value 55 of the reference range 54.

At least one of the two counters 15, 25 then triggers a corresponding P0-interrupt request 43, 44 and a permanent P0-interrupt 58 is generated. From time 59 on which a permanent interrupt 58 is generated, the security control is shut down in a security-related manner.

Figure 4:
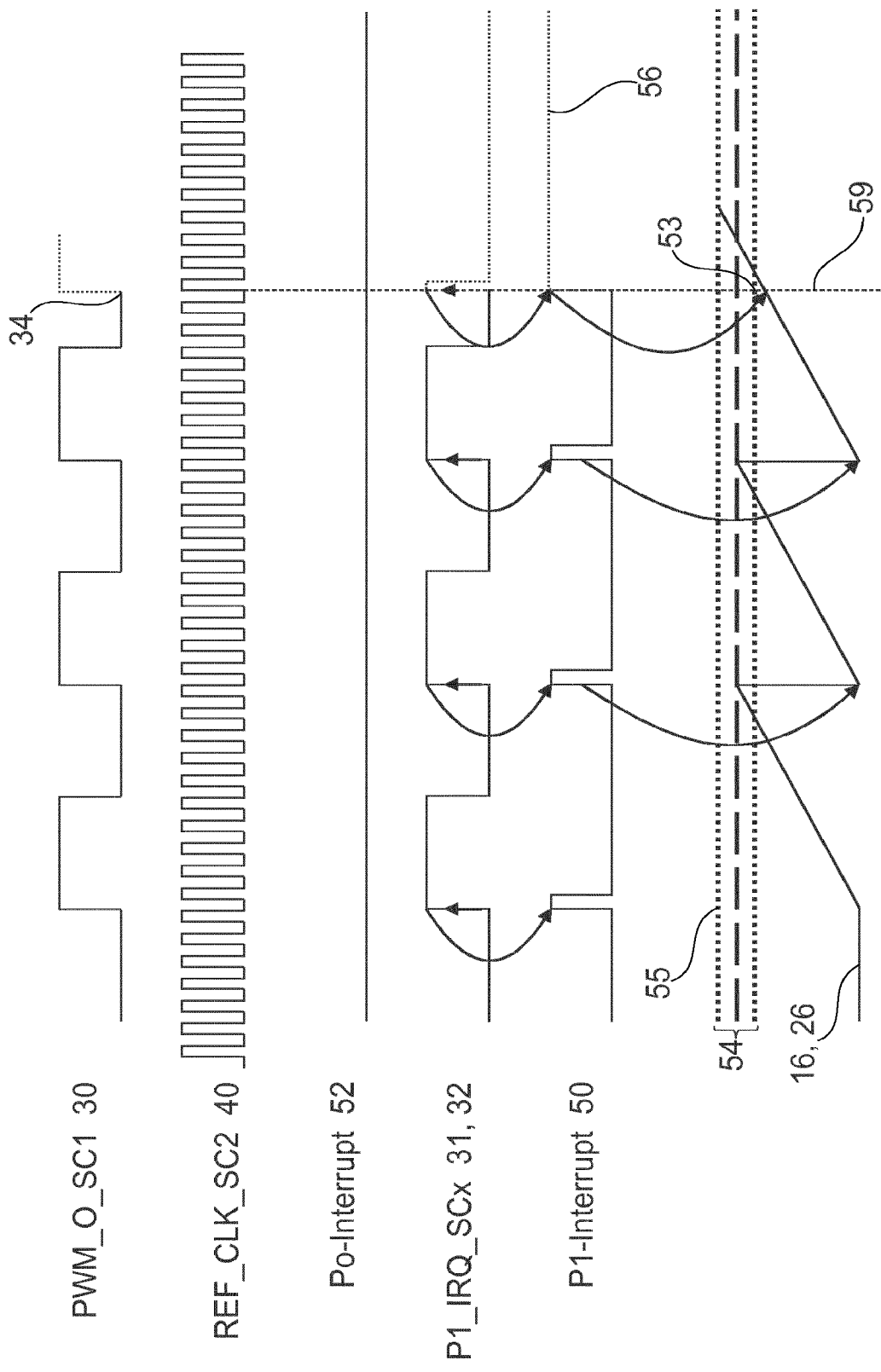
FIG. 4 a schematic view of the signal curves in a faulty shortened clock interval of the first clock signal.

FIG. 4 shows the schematic signal waveforms in the case of a faulty shortened clock interval 34 of the first clock signal 30. The edge of the first clock signal 30 causes P1-interrupt requests 31, 32, and thus also P1-interrupts 50.

However, since this happens at an earlier point in time than predetermined, the counter readings 16, 26 of the two counters 15, 25 are below the minimum value 53 of the reference range 54. In response to the erroneous counter readings 16, 26, a permanent P1-interrupt 56 remains. From the time 59 at which a permanent interrupt 56 is generated, the security control is security-related shut down.

Figure 5:
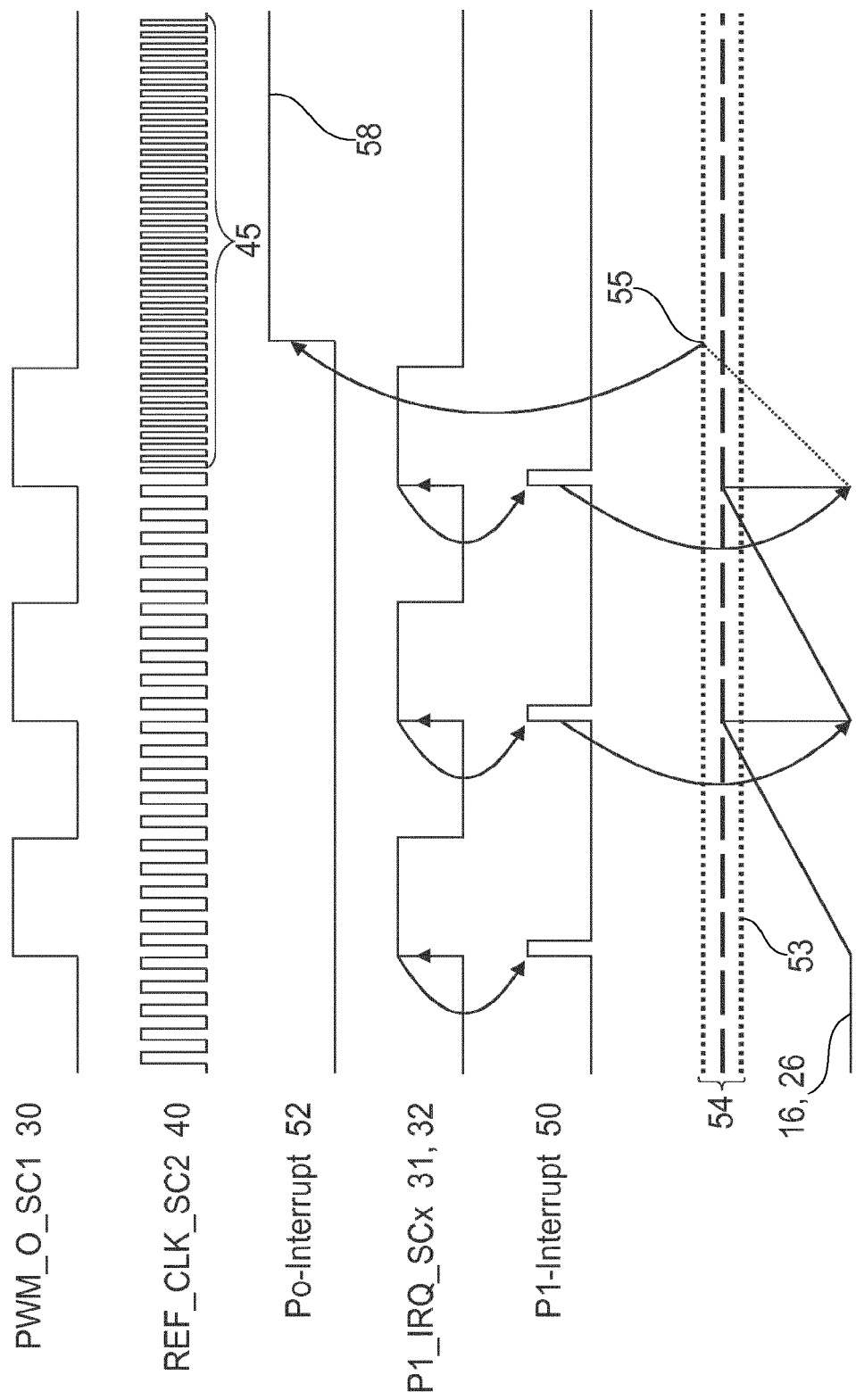
FIG. 5 a schematic view of the signal curves in a faulty shortened clock interval of the second clock signal.

FIG. 5 shows the schematic signal curves in the case of a faulty shortened clock interval 45 of the second clock signal 40. Due to the greater number of clocks of the second clock signal 40 during a clock interval of the first clock signal 30, the counter readings 16, 26 of the counters 15, 25 increase faster than predetermined. As a result, the counter readings 16, 26 reach the maximum value 55 of the reference range 54 even before a P1-interrupt 50 is triggered and the counter readings 16, 26 are evaluated. When the maximum value 55 of the reference range 54 is reached, a corresponding P0-interrupt request 43, 44 is triggered by at least one of the counters 15, 25, which in turn generates a permanent P0-interrupt 58, which leads to the security-related shutdown of the security control.

FIG. 6 shows the schematic signal curves in the case of a faulty extended clock interval 46 of the second clock signal 40. At an edge of the first clock signal 30, the P1-interrupt requests 31, 32 are executed, whereby a P1-interrupt 50 is generated.

During the P1-interrupt 50, the counter readings 16, 26 of the two counters 15, 25 are determined. Since the second clock signal 40 has larger clock intervals than predetermined, the number of clocks of the second clock signal 40 is less during a clock interval of the first clock signal 30, and thus the counter readings 16, 26 are smaller than expected and are below the minimum value 53 of the reference range 54. In response to the erroneous counter readings 16, 26, a permanent P1-interrupt 56 remains, which leads to the security-related shutdown of the security control.

Accordingly, deviations of the clock frequency of the first and second clock signal from the respective nominal frequency lead to a secure shutdown of the security control. In doing so, errors in the synchronicity of the two controller are avoided and it is ensured that the security control can carry out a security-related shutdown within the required response time.

For a security control according to the present invention, it is possible to use standard microcontrollers which, according to the invention, are synchronized with one another in terms of time. In general, however, the security control can also be made up of more than two controllers. This allows an interchangeability and scalability of the security control, reducing costs or minimizing them, and the security control can be flexibly adapted to the respective task.

LIST OF REFERENCE NUMBERS 1 security control
10 first controller
11 first clock generator
12 output at the first controller
13 first input at the first controller
14 second input at the first controller
15 first counter in the first controller
16 counter reading of the first counter
20 second controller
21 second clock generator
22 output at the second controller
23 first input at the second controller
24 second input at the second controller
25 second counter in the second controller
26 counter reading of the second counter
30 first clock signal
31 P1-interrupt request in the first controller
32 P1-interrupt request in the second controller
33 extended clock interval of the first clock signal
34 shortened clock interval of the first clock signal
40 second clock signal
41 input signal of the second clock signal in the first controller
42 input signal of the second clock signal in the second controller
43 P0-interrupt request in the first controller
44 P0-interrupt request in the second controller
45 shortened clock interval of the second clock signal
46 extended clock interval of the second clock signal
50 P1-interrupt
52 P0-interrupt
53 minimum value of the reference range
54 reference range
55 maximum value of the reference range
56 permanent P1-interrupt
58 permanent P0-interrupt
59 time of triggering a permanent interrupt

The invention claimed is:

1. A control device, comprising:
a first controller comprising a first processor having a first clock generator for generating a first clock signal;
a separate second controller comprising a second processor having a second clock generator for generating a second clock signal,
wherein the first clock signal is output to a first input of the first controller and to a first input of the second controller, the first clock signal triggering an interrupt in the first controller and the second controller, and
wherein the second clock signal is output to a second input of the first controller and to a second input of the second controller.

2. The control device according to claim 1, wherein the frequency of the second clock signal is higher than the frequency of the first clock signal.

3. The control device according to claim 1, wherein the first controller comprises a first counter and the second controller comprises a second counter, and the second clock signal is routed to the first counter and the second counter and the clocks of the second clock signal are counted by means of the first and the second counter.

4. The control device according to claim 3, wherein:
the first clock signal triggers a P1-interrupt simultaneously in the first and second controllers;
the first counter and the second counter determine the number of clocks of the second clock signal since a previous P1-interrupt;
the first processor of the first controller or the second processor of the second controller is configured to:
correlate the counter readings of the respective first or second counter with the time between two interrupts;
determine if the counter readings of the respective first or second counter is outside its reference range; and
provide an error output if the counter readings are outside the reference range.

5. The control device according to claim 4, wherein the first processor of the first controller or the second processor of the second controller is configured to initiate a shutdown mode of the first controller and the second controller upon detecting the error output, if at least one of the counter readings of the first or second counter is below the minimum value of the reference range.

6. The control device according to claim 3, wherein the first processor of the first controller and/or the second processor of the second controller is configured to initiate a shutdown mode of the first controller and the second controller if at least one of the counter readings of the first or second counter exceeds the maximum value of a reference range.

7. A method for operating a security control comprising a first controller comprising a first processor having a first clock generator M and a separate second controller comprising a second processor having a second clock generator, the method comprising:
  generating a first clock signal by the first clock generator;
  generating a second clock signal independent of the first clock signal by the second clock generator;
  outputting the first clock signal to a first input of the first controller and to a first input of the second controller, the first clock signal triggering an interrupt in the first controller and the second controller; and
  outputting the second clock signal to a second input of the first controller and to a second input of the second controller.

8. The method according to claim 7, wherein the frequency of the second clock signal is higher than the frequency of the first clock signal.

9. The method according to claim 7, furthermore comprising the steps of counting the second clock signal by a first counter in the first controller and by a second counter in the second controller.

10. The method according to claim 9, furthermore comprising the following steps:
  triggering a P1-interrupt in the first and second controllers by the first clock signal;
  determining the number of clocks of the second clock signal since a previous P1-interrupt by means of the first counter and the second counter;
  correlating the counter reading of the first counter in the first controller and/or of the second counter with the time between two P1-interrupts; and
  providing an error output by the first controller and/or by the second controller when the counter reading of the respective first or second counter, is outside a reference range.

11. The method according to claim 10, comprising initiating a permanent interrupt based on the error output of the first or second controller if at least one of the counter readings of the first or second counter is below the minimum value of the reference range.

12. The method according to claim 9, comprising initiating a permanent interrupt based on the first counter and/or the second counter if at least one of the counter readings of the first or second counter exceeds the maximum value of a reference range.

* * * * *